(12) United States Patent
Stewart

(10) Patent No.: US 12,186,863 B2
(45) Date of Patent: Jan. 7, 2025

(54) DRILL ATTACHMENT

(71) Applicant: Joshua Alan Stewart, Trabuco Canyon, CA (US)

(72) Inventor: Joshua Alan Stewart, Trabuco Canyon, CA (US)

(*) Notice: Subject to any disclaimer, the term of this patent is extended or adjusted under 35 U.S.C. 154(b) by 422 days.

(21) Appl. No.: 17/507,530

(22) Filed: Oct. 21, 2021

(65) Prior Publication Data

US 2022/0118588 A1 Apr. 21, 2022

Related U.S. Application Data

(60) Provisional application No. 63/094,436, filed on Oct. 21, 2020.

(51) Int. Cl.
*B25B 21/00* (2006.01)
*B23B 45/00* (2006.01)

(52) U.S. Cl.
CPC .......... *B25B 21/007* (2013.01); *B23B 45/003* (2013.01); *B25B 21/002* (2013.01)

(58) Field of Classification Search
CPC ... B25B 21/007; B25B 21/002; B25B 13/481; B23B 45/003
See application file for complete search history.

(56) References Cited

U.S. PATENT DOCUMENTS

| | | | |
|---|---|---|---|
| 3,532,012 A * | 10/1970 | Pryor | B25B 13/481 81/57.29 |
| 5,168,780 A * | 12/1992 | Van Gennep | B25B 13/481 362/120 |
| 5,730,541 A * | 3/1998 | Duett | F16B 7/06 403/44 |
| 6,945,139 B1 * | 9/2005 | Johnson | B25B 17/00 81/177.2 |
| 7,089,827 B2 * | 8/2006 | Wexler | B25B 17/00 81/169 |
| 7,263,917 B1 * | 9/2007 | Benysh | B25B 13/481 81/57.36 |
| 7,500,412 B1 | 3/2009 | Maciejewski | |
| 8,701,525 B2 | 4/2014 | Grover et al. | |
| 9,149,916 B2 * | 10/2015 | Kiser | B25B 17/00 |
| 11,161,226 B2 * | 11/2021 | Sawa | B25B 13/467 |
| 2008/0196554 A1 * | 8/2008 | Tutino | B25B 23/0035 81/57.3 |
| 2017/0036326 A1 * | 2/2017 | Angello | B25B 17/02 |
| 2019/0152007 A1 | 5/2019 | Monroy | |

* cited by examiner

*Primary Examiner* — David B. Thomas
(74) *Attorney, Agent, or Firm* — Plager Schack LLP; Mark H. Plager, Esq.; Naomi Mann, Esq.

(57) ABSTRACT

Disclosed is a drill attachment device comprising a transfer gear configured to rotate about an axis perpendicular to the axis of a drill used to power the transfer gear. The transfer gear may comprise an open-ended slot which provides a passageway through which a threaded rod may pass. The open-ended slot may further be configured to retain a mechanical nut, enabling a user to run a threaded rod through the open-ended slot for driving the nut along the rod. The transfer gear may also support an external driver, and the drill attachment device may comprise guide slots configured to position the rod and/or nut against the external driver for driving a nut up or down rod.

13 Claims, 4 Drawing Sheets

DRILL ATTACHMENT

RELATED APPLICATION

This application claims benefit to U.S. Provisional Application No. 63/094,436 filed Oct. 21, 2020, which is incorporated by reference herein in its entirety.

BACKGROUND

The present disclosure relates generally to drill attachment devices and methods.

Repeated manual threading of a nut on a threaded rod may be a slow and fatiguing process. As such, there is a need for an improved system which address at least the above-mentioned problems with the prior art.

SUMMARY

According to various embodiments, disclosed is a drill attachment device comprising a transfer gear configured to rotate about an axis perpendicular to the axis of a drill used to power the transfer gear. In embodiments, the transfer gear may comprise an open-ended slot which provides a passageway through which a steel threaded rod may pass. In embodiments, the open-ended slot may be configured to retain a nut, enabling a user to run a threaded rod through the open-ended slot, and to drive the nut up or down the rod as the nut spins within the slot using drill power. In some embodiments, the open-ended slot may be configured to retain different sized nuts. In some further embodiments, the open-ended slot may comprise bristles and/or thread cutters which extend radially into the hollow of the slot, and may be used to surface treat the rod (e.g., clean the rod threads, and/or cut threads within the rod) using drill power.

In some further embodiments, the transfer gear may support an external driver, and the drill attachment device may comprise guide slots configured to position the rod and/or nut against a contact surface of the external driver. The external driver and guide slots provide an alternative mechanism within the drill attachment device for enabling the user to drive a nut up or down rod, and/or to surface treat the rod using drill power.

The drill attachment device enables a user to hold the drill in a comfortable and ergonomically correct position, which is perpendicular to the rod axis, and to avoid using hand power for driving a nut and/or other material up and down rod, and may further be used for treating the surface of the rod.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
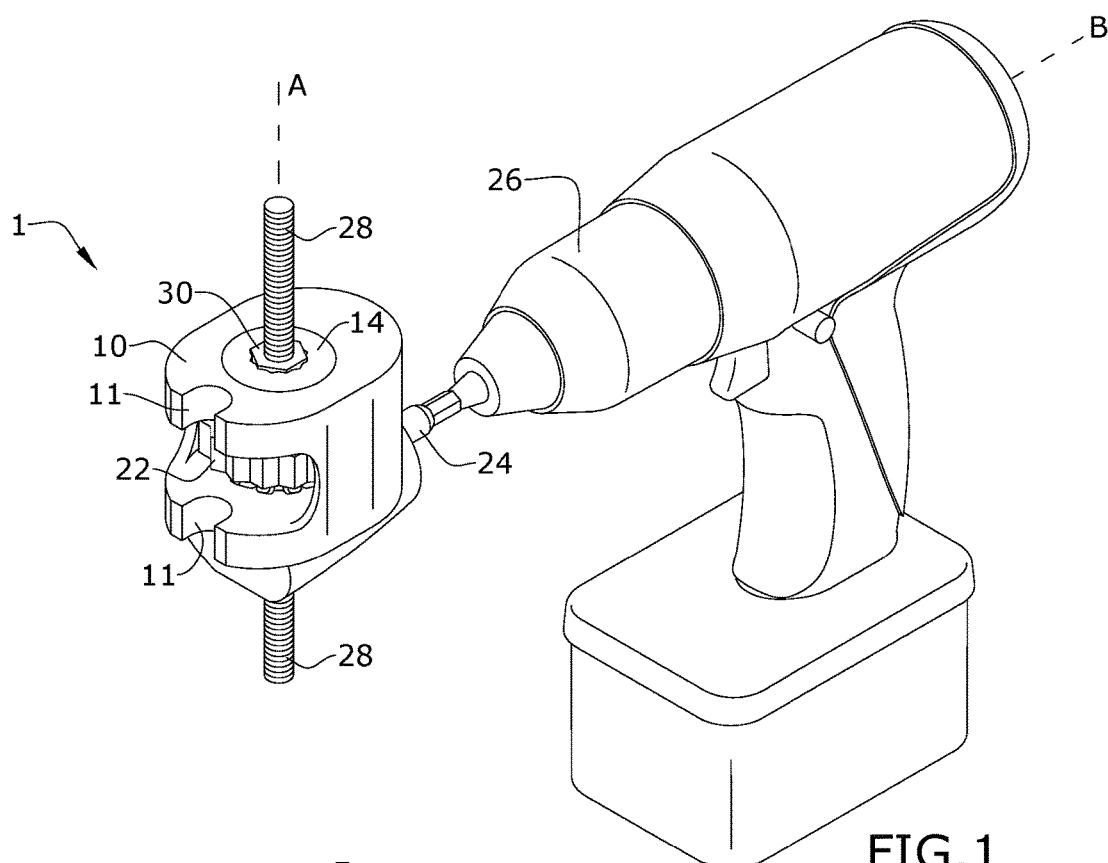
FIG. 1 is a perspective view of a drill attachment device shown in use with a drill, according to certain embodiments.
Figure 2:
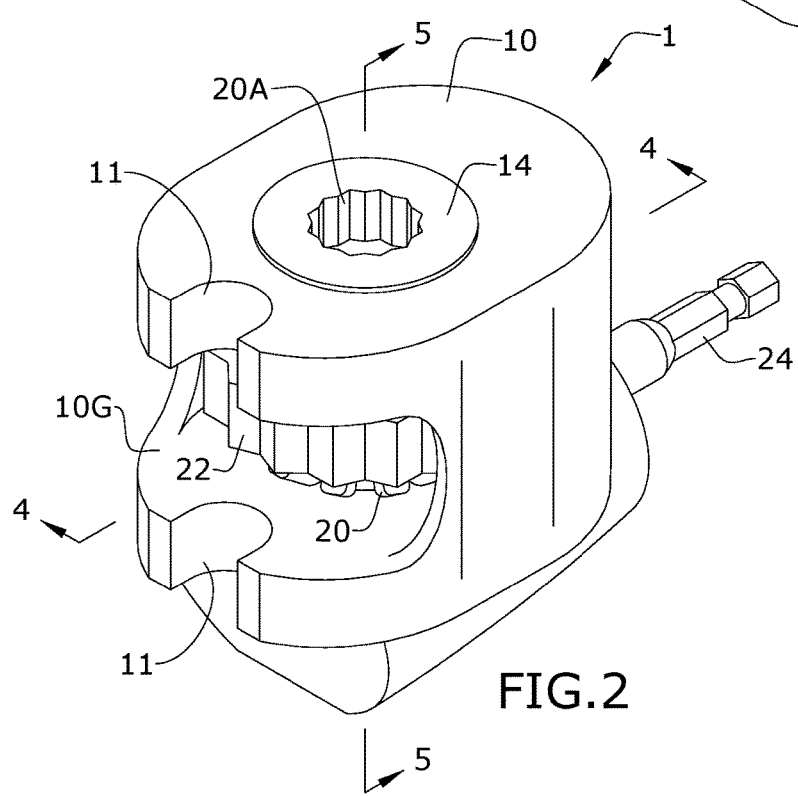
FIG. 2 is a perspective view of the drill attachment device shown independent of the drill.
Figure 3:
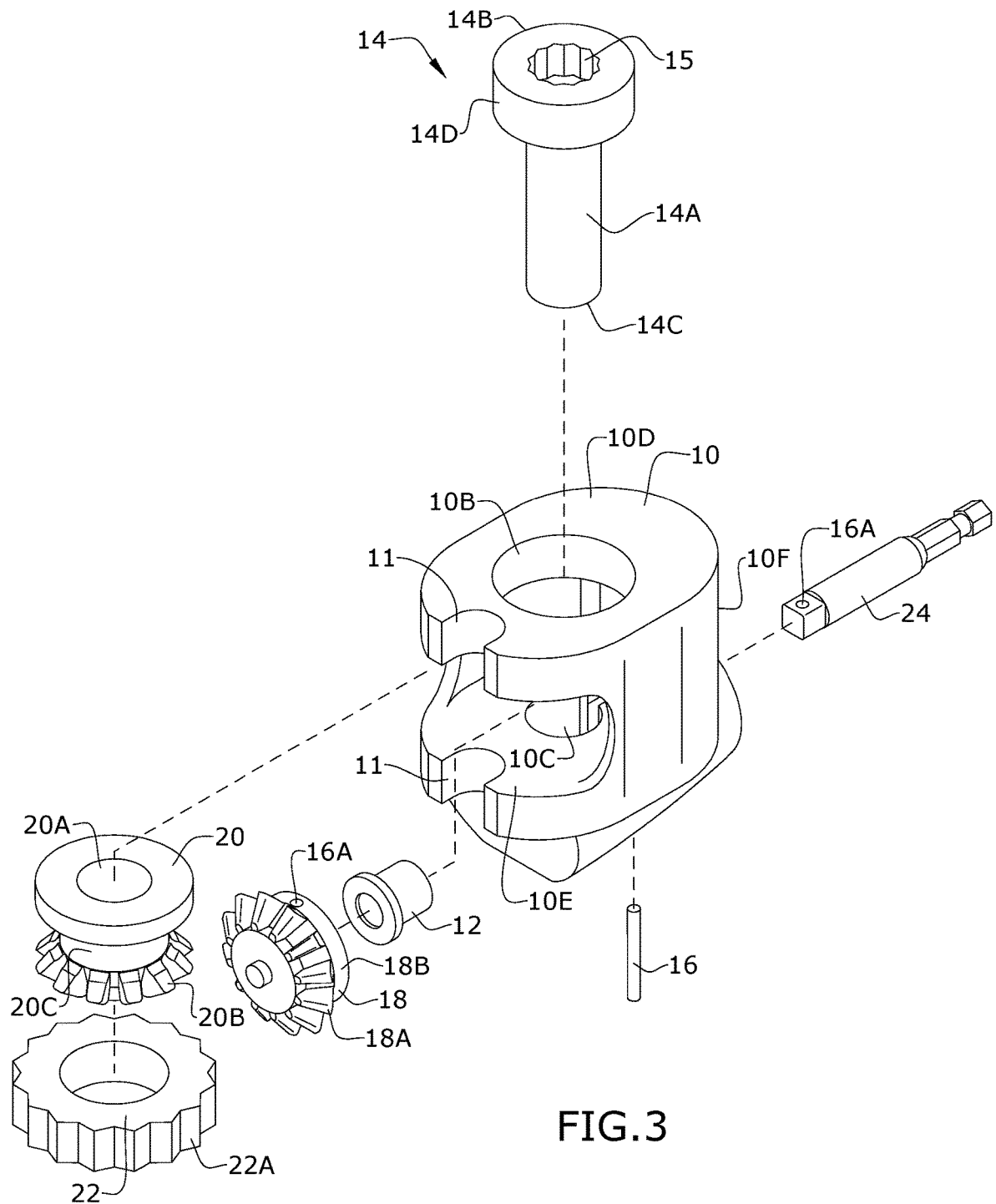
FIG. 3 is an exploded view of the drill attachment device.

In embodiments as depicted in FIGS. 1-9, a drill attachment device 1 comprises a transfer gear 20 configured to rotate about an axis 'A' perpendicular to an axis 'B' of a drill 26 used to power transfer gear 20, and an open-ended slot 20A within the transfer gear. In embodiments, open ended slot 20A is open on both top and bottom ends, and provides a passageway centered about transfer gear 20, to permit an item such as a steel threaded rod 28, which may be of unlimited length, to pass entirely through device 1. In embodiments, open-ended slot 20A may be configured to retain a mechanical nut 30 (e.g., hex nut), or other hardware. In some embodiments, open-ended slot 20A may be configured to retain different sized nuts. In some further embodiments, open-ended slot 20A may comprise bristles 42 and/or thread cutters 38 which extend radially into the hollow of the slot. In embodiments, a user may run rod 28 through open-ended slot 20A to drive a nut and/or other material(s) supported on the nut, up or down rod 28, and/or to surface treat the rod (e.g., clean the rod threads, and/or cut threads within the rod) using drill power. In some further embodiments, transfer gear 20 may support an external driver 22, wherein attachment device 1 may comprise at least one external guide or guide slots 11 configured to position the rod and/or nut against a contact surface 22A of external driver 22. External driver 22 and external guide(s) 11 provide an alternative mechanism within drill attachment device 1 for enabling the user to drive nut 30 and/or other material up or down rod 28, and/or to surface treat the rod using drill power. Drill attachment device 1 further enables a user hold drill 26 in a comfortable and ergonomically correct position, which is perpendicular to the rod axis, and to avoid using hand power, for driving a nut and/or other material up and down rod 28, and/or for surface treating the rod.

In certain embodiments, as best depicted in FIGS. 1-5, drill attachment device 1 may generally comprise a housing 10 configured to retain transfer gear 20 and a drive gear 18. In one embodiment, housing 10 may generally comprise a top wall 10D, a bottom wall 10E, and a side wall 11F, as will be described.

In embodiments, drive gear 18 and transfer gear 20 may be in cross-axial gear engagement, wherein drive gear 18 is configured to rotate about axis B, for driving a rotation of transfer gear 20 about axis A. Gear teeth 18A of drive gear 18 intermesh with gear teeth 20B of transfer gear 20 for driving said rotation of transfer gear 20. It should be appreciated that other gear arrangements, which may include additional or alternative gear components, may be employed to achieve a similar result in alternate embodiments.

Figure 4:
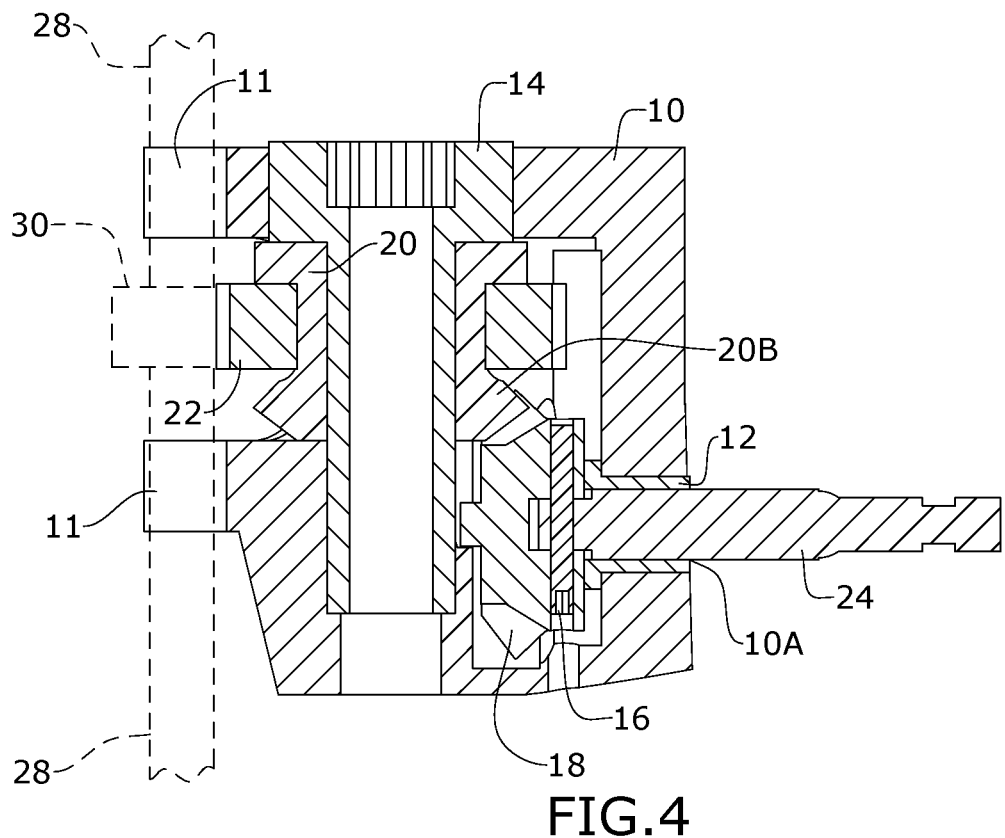
FIG. 4 is a section view taken along line 4-4 of FIG. 2; the view depicts a rod and nut positioned within external guide slots of the drill attachment device and drawn in hidden lines for clarity.
Figure 5:
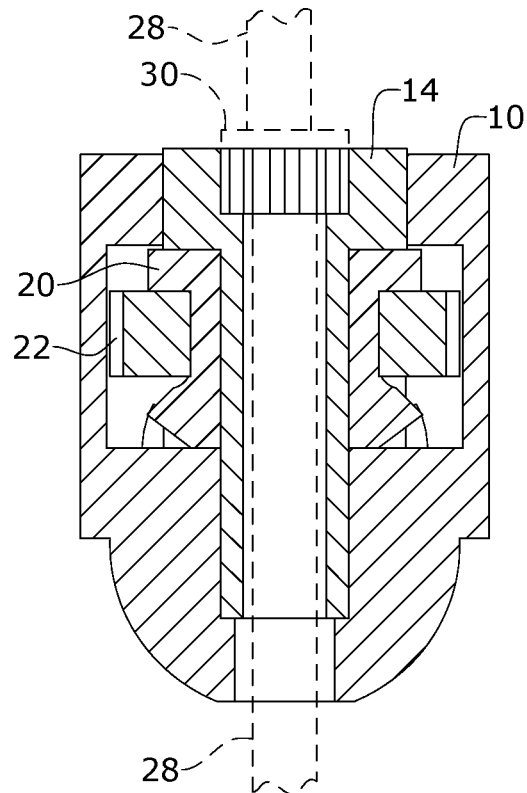
FIG. 5 is a section view taken along line 5-5 of FIG. 2, wherein the rod and nut are shown positioned within a pass-through shaft of the device, and drawn in hidden lines for clarity.

In embodiments, drive gear 18 is configured to be driven by drill 26 via a drill connection shaft 24. In one embodiment, drive gear 18 and drill shaft 24 connect via a set screw 16, which may be press fitted through set screw openings 16A within drill connection shaft 24 and collar 18B of drive gear 18, as shown. In one embodiment, drill connection shaft 24 may pass through a drill shaft opening 10A within a rear side of side wall 10F of housing 10. In certain embodiments, a flange bushing 12 may be disposed around drill connection shaft 24, within opening 10A as shown in FIG. 4. It should be appreciated that different configurations and/or components for engagement between drive gear 18 and drill 26 may be used in alternate embodiments. For example, drive gear 18 may be configured to receive a drill attachment which may be removable from drill attachment device 1.

In certain embodiments, a pass-through shaft 14 may be disposed within open ended slot 20A of transfer gear 20. Pass-through shaft 14 may generally comprise a tubular body 14A defining a central hollow, and is open on both top and bottom ends 14B, 14C, respectively, for providing a passageway centered about transfer gear 20 to permit an item such as rod 28 to pass entirely through. In one embodiment, pass-through shaft 14 may comprise a tubular shaft head 14D which may expand outwards with respect to tubular body 14 to provide a T-shaped pass-through shaft 14. In one embodiment, pass-through shaft 14 may be press fitted through open-ended slot 20A such that it rotates together with transfer gear 20. In some embodiments, bottom end 14B of pass-through shaft 14 may be rotationally supported within an open-ended trenched support platform 10C provided within bottom wall 10E of housing 10. In embodiments, trenched support platform 10C provides an open support on which pass-through shaft 14 may situate, leaving pass-through shaft 14 unobstructed for passage of rod 28. In one embodiment, bottom end 14B of shaft 14 may be chamfered such that it may smoothly rotate within trenched support platform 10C. Additionally, shaft head 10D may be configured to slip fit though a top opening 10B within top wall 10D of housing 10.

In certain embodiments, as best depicted in FIGS. 1-6, and 9, pass-through shaft 14 may comprise at least one nut retaining socket 15 configured to retain nut 30 for rotation of the nut within shaft 14. In this manner, nut 30 may be driven by drill 26 along threaded rod 28, as rod 28 passes through shaft 14.

Figure 6:
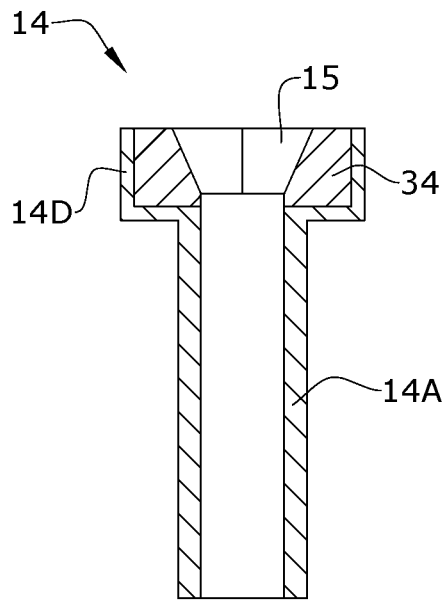
FIG. 6 is a section view of a pass-through shaft for the drill attachment device, in accordance with an alternate embodiment.
Figure 9:
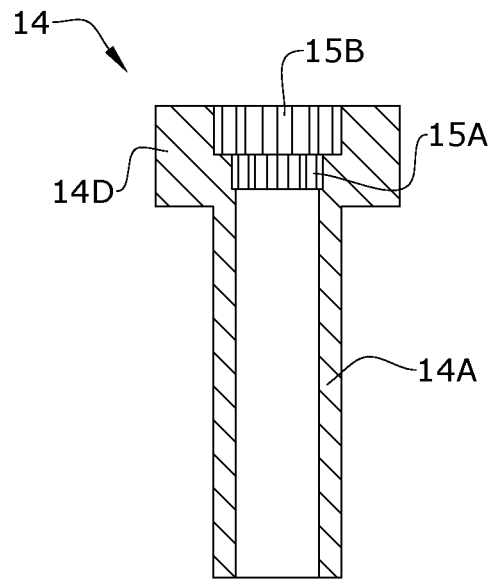
FIG. 9 is a section view of a pass-through shaft for the drill attachment device, in accordance with a further alternate embodiment.

In one embodiment as best depicted in FIGS. 1-5, nut retaining socket 15 may be configured to hold a nut of a specific size and shape. In one example, nut retaining socket 15 may be a 12 point 1/2 inch socket, but is not limited to this option. In another embodiment as depicted in FIG. 6, nut retaining socket 15 may comprise a compressible insert 34, which may be a rubber or silicon material. In embodiments, compressible insert 34 (i.e. rubber insert) may provide a flexible nut retaining mechanism to permit different sized nuts to be capture within socket 15. As a low degree of force, e.g. hand force, is typically sufficient to spin the nut along threaded rod 28, the retaining force of rubber insert 34 may adequately hold nut 30 in place and prevent its dislodging. In an alternate embodiment, as shown in FIG. 9, nut retaining socket 15 may comprise multiple sockets in a stepped configuration, for retaining nuts of different sizes. For example, as depicted in FIG. 9, a first nut retaining socket 15A may be configured to hold a nut of a first shape and size, a second nut retaining socket 15B stepped up from the first nut retaining socket may be configured to hold a nut of a second shape and size which is larger than the first size. It should be appreciated that rubber insert 34, nut retaining socket(s) 15, 15A, 15B, may have different shapes and sizes in alternate embodiments.

Figure 7:
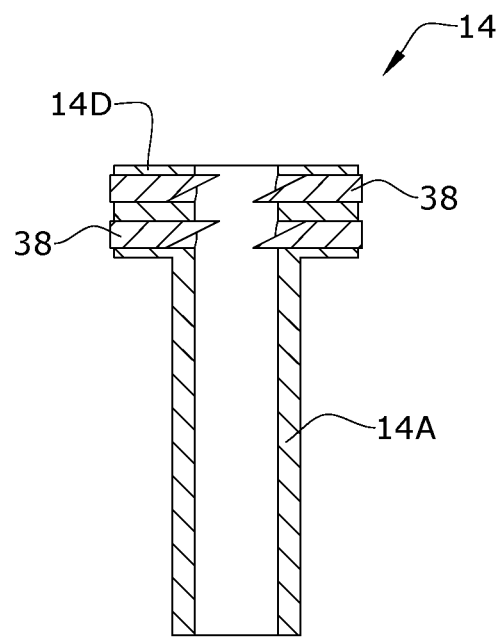
FIG. 7 is a section view of a pass-through shaft for the drill attachment device, in accordance with another alternate embodiment.
Figure 8:
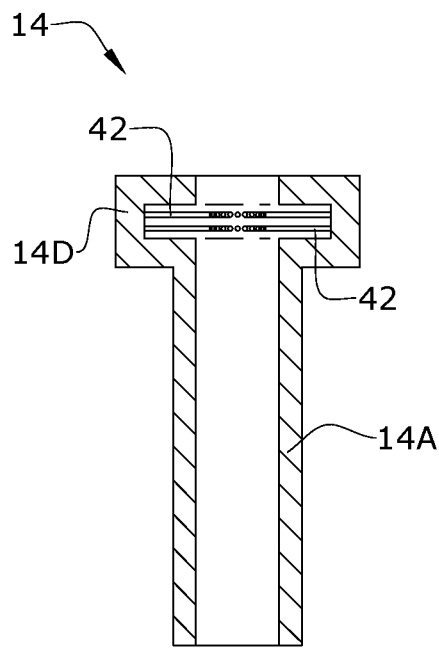
FIG. 8 is a section view of a pass-through shaft for the drill attachment device, in accordance with yet another alternate embodiment.

In a further embodiment, as depicted in FIG. 7, pass-through-shaft 14 may comprise internal thread cutters 38, which may be configured to cut out new threading, and/or clean away hard deposits from threads within rod 28 by passing rod 28 through shaft 14 as the shaft rotates. In another embodiment, as depicted in FIG. 8, pass-through shaft 14 may comprise internal bristles 42, configured to provide softer cleaning of threads within rod 28 by passing rod 28 through shaft 14 as the shaft rotates. In embodiments, bristles 42 may be metallic, and may be used for example, to strip away rust or paint from rod 28.

It should be appreciated that pass-through shaft 14 may be a single unitary piece, or comprised of multiple pieces, according to various embodiments. It should be appreciated that slot 20A and/or pass-through shaft 14 may have different shapes in alternate embodiments. For example, while pass-through shaft 14 is depicted as having an expanded shaft head 14D, pass-through shaft 14 may be a straight tubular piece in alternate embodiments. It should be appreciated that open-ended slot 20A may be configured to perform the same function as pass-through shaft 14 and/or that slot 20A and pass-through shaft 14 may be an integral piece in alternate embodiments. As such, nut retaining socket(s) 15, rubber insert 34, bristles 42, and/or cutters 38 may be provided directly within slot 20A, wherein a separate pass-through shaft unit may be omitted in certain embodiments. It should be appreciated, that bristles 42 and/or cutters 38 may be provided down the entire length of pass-through shaft 14/ open-ended slot 20 in alternate embodiments. It should further be appreciated that other surface treatment components may be provided within pass-through shaft 14/ open-ended slot 20 in alternate embodiments; these may include for example, sanding and/or abrasive components, buffing components, polishing components, and the like.

In some further embodiments as depicted in FIGS. 1-5, external driver 22 may be fitted about a collar 20C of transfer gear 20, such that it rotates together with transfer gear 20. In certain embodiments, collar 20C may be disposed between a top component 20D of transfer gear 20, and gear teeth 20B, as shown. In one embodiment, external driver 22 may be molded of a flexible soft material such as silicone (e.g. Mold Max®40), which enables it to be stretched and fitted over collar 22C for a high friction grip around collar 22C. It shall be appreciated that external driver 22 may be made of different material(s) in alternate embodiments. In some alternate embodiments, external driver 22 and transfer gear 20 may be a unitary piece.

In embodiments, external driver 22/ contact surface 22A of external driver 22 may be used to impart a rotational force against nut 30 for driving nut 30 along threaded rod 28. In some embodiments, contact surface 22A of external driver 22 may have a toothed or ridged pattern, as shown, for effective transference of force against nut 30. In some embodiments, contact surface 22A of external driver 22 may be exposed through a front opening 10G within side wall 10F of housing 10. Additionally, external guides comprising guide slots 11 may be provided within a front side of top and bottom walls 10D and 10E of housing 10, as shown. The guide slots 11 are configured to position threaded rod 28 and nut 30 at an appropriate distance from contact surface 22A, for driving nut 30 up or down rod 28 (see FIG. 4). In some alternate embodiments, contact surface 22A may be provided with surface treatment components, such as cutters 38, bristles 42, abrasive components, buffing components, polishing components, and the like. As such, the drill attachment device 1 provides the user with alternate means for driving nut 30 up and down threaded rod 28, and/or for surface treatment of rod 28 using drill power. Attachment device further enables the user to hold the drill in an ergonomically comfortable 90 degree orientation to the rod. The housing works in conjunction with the pass-through slot and external driver to effectively engage the nut or other fastening hardware, where the housing may absorb the energy by counter bracing the threaded rod while the device is engaging the hardware.

It shall be appreciated that drill attachment device 1 can have multiple configurations in different embodiments. In embodiments, components of attachment device 1 may be 3-D printed, machined, molded, and/or forged out of resins, plastics, rubber, silicone, carbon fiber, filaments and/or carbon fiber nylon, aluminum or other metal, and the like. It shall be appreciated that the components of drill attachment device 1 described in several embodiments herein may comprise any alternative known materials in the field and be of any color, size and/or dimensions. It shall further be appreciated that the components of drill attachment device 1 described herein may be manufactured and assembled using any known techniques in the field.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A drill attachment device configured for attachment to a drill, the drill having a drill axis, the drill attachment device comprising:
    a housing comprising a top wall, a bottom wall, and a side wall extending between the top wall and the bottom wall,
    a transfer gear and a drive gear retained within said housing,
    the drive gear configured to be driven by a drill via a drill connection shaft, the drive gear further configured to drive a rotation of the transfer gear about a transfer gear rotational axis perpendicular the drill axis when the drive gear is driven, the transfer gear comprising an external driver extending radially outwards with respect to the transfer gear rotational axis, wherein the external driver is exposed through a front opening within the side wall of the housing;
    at least one external guide configured to align a threaded rod against the external driver and in parallel alignment to the transfer gear rotational axis, such that the external driver can engage and rotate a nut upon the threaded rod,
    wherein the external guide comprises slots within a front side of the top and bottom walls of the housing.

2. The drill attachment device of claim 1, further comprising an open-ended slot within the transfer gear, said open-ended slot being open on both top and bottom ends of the slot, and providing a passageway centered about the transfer gear.

3. The drill attachment device of claim 2, wherein the open-ended slot comprises at least one nut retaining socket.

4. The drill attachment device of claim 2, wherein the open-ended slot comprises multiple nut retaining sockets, each configured to retain a different sized nut.

5. The drill attachment device of claim 2, wherein the open-ended slot comprises a nut retaining socket and a compressible insert within the nut retaining socket, the compressible insert configured to retain nuts of different sizes.

6. The drill attachment device of claim 2, wherein the open-ended slot comprises bristles and/or thread cutters extending radially into a hollow of the open-ended slot.

7. The drill attachment device of claim 2, wherein the open-ended slot comprises a pass-through shaft disposed within the open-ended slot, the pass-through shaft providing said passageway centered about the transfer gear, the pass-through shaft supporting at least one nut retaining socket, thread cutters, bristles, a compressible insert, or combinations thereof, the pass-through shaft being rotationally supported within an open-ended trenched support platform provided within the bottom wall of the housing.

8. The drill attachment device of claim 1, wherein the external driver comprises a ridged contact surface.

9. A drill attachment device configured for attachment to a drill, the drill having a drill axis, the drill attachment device comprising:
    a housing comprising a top wall, a bottom wall, and a side wall extending between the top and bottom walls, the top wall further including a top opening,
    a transfer gear and a drive gear retained within said housing and between the top and bottom walls of the housing,
    the drive gear configured to be driven by a drill via a drill connection shaft, the driver gear further configured to drive a rotation of the transfer gear about a transfer gear rotational axis perpendicular the drill axis, when the driver gear is driven;
    an open-ended slot within the transfer gear, said open-ended slot being open on both top and bottom ends of the slot, and providing a passageway centered about the transfer gear,
    wherein the open-ended slot comprises a first nut retaining socket configured to hold a nut of a first size, and a second nut retaining socket stepped up from the first nut retaining socket and configured to hold a nut of a second size which is larger than the first size, the first and second nut retaining sockets being centered about the top opening in the top wall.

10. A drill attachment device configured for attachment to a drill, the drill having a drill axis, the drill attachment device comprising:
    a housing comprising a top wall, a bottom wall, and a side wall between the top wall and the bottom wall, the top wall further including a top opening;

a drive gear retained within the housing and between the top and bottom walls of the housing, the drive gear configured for drivable engagement with the drill via a drill connection shaft;

a transfer gear retained within the housing and between the top and bottom walls of the housing, the transfer gear being in cross-axial gear engagement with the drive gear, wherein gear teeth of said drive gear intermesh with gear teeth of said transfer gear for driving a rotation of the transfer gear about an axis perpendicular to the drill axis;

an open-ended slot within the transfer gear, and a pass-through shaft disposed within the open-ended slot, the pass-through shaft providing a passageway centered about the transfer gear, the pass-through shaft supporting at least one nut retaining socket, thread cutters, bristles, a compressible insert, or combinations thereof, said pass-through shaft being rotationally supported within an open-ended trenched support platform provided within the bottom wall of the housing, wherein the trenched support platform provides an open support on which pass-through shaft can rotate and leaves the pass-through shaft unobstructed for passage of a rod.

11. The drill attachment device of claim 10, further comprising an external driver extending radially outwards from the transfer gear, the external driver configured to engage and rotate a nut upon the threaded rod when the rod is positioned within a guide element provided within said housing, wherein a contact surface of the external driver is exposed through a front opening within the side wall of the housing.

12. The drill attachment device of claim 11, wherein the external drive and open-ended slot within the transfer gear provide alternate means for driving a mechanical nut along a rod, the rod being in perpendicular alignment with the drill axis.

13. The drill attachment device of claim 10, wherein the pass-through shaft comprises a first nut retaining socket configured to hold a nut of a first size, a second nut retaining socket stepped up from the first nut retaining socket and configured to hold a nut of a second size which is larger than the first size.

* * * * *